United States Patent
Chino et al.

(10) Patent No.: US 8,400,488 B2
(45) Date of Patent: Mar. 19, 2013

(54) OPTICAL SCANNING APPARATUS AND CONTROL METHOD THEREFOR

(75) Inventors: Noriyuki Chino, Kawasaki (JP); Katsuhiko Takano, Yokohama (JP); Shoji Kanemura, Sagamihara (JP); Junji Yasuda, Kawasaki (JP); Kota Kiyama, Kawasaki (JP)

(73) Assignee: Canon Kabushiki Kaisha (JP)

( * ) Notice: Subject to any disclaimer, the term of this patent is extended or adjusted under 35 U.S.C. 154(b) by 81 days.

(21) Appl. No.: 13/187,095

(22) Filed: Jul. 20, 2011

(65) Prior Publication Data

US 2012/0019608 A1 Jan. 26, 2012

(30) Foreign Application Priority Data

Jul. 20, 2010 (JP) .................................. 2010-163250

(51) Int. Cl.
 *B41J 2/435* (2006.01)
 *B41J 2/47* (2006.01)
(52) U.S. Cl. ........................................ 347/235; 347/250
(58) Field of Classification Search .................. 347/229, 347/234, 235, 248–250
 See application file for complete search history.

(56) References Cited

U.S. PATENT DOCUMENTS

| 7,489,328 B2 * | 2/2009 | Akamatsu | 347/235 |
| 7,573,494 B2 * | 8/2009 | Yoshida | 347/235 |
| 7,889,221 B2 * | 2/2011 | Koga | 347/235 |

FOREIGN PATENT DOCUMENTS

| JP | 08-132670 A | 5/1996 |
| JP | 2006-150696 A | 6/2006 |

\* cited by examiner

*Primary Examiner* — Hai C Pham
(74) *Attorney, Agent, or Firm* — Rossi, Kimms & McDowell LLP

(57) ABSTRACT

An optical scanning apparatus capable of properly correcting a main scanning scale factor. Upstream and downstream laser-light detection sensors of the optical scanning apparatus each generate a signal when first or second light beam passes through each of slits formed in the sensors. Based on signals, a scanning time required for each light beam to scan between the sensors is measured. A correction coefficient is decided by a correction value calculation unit based on a difference between wavelengths of the first and second light beams, a scanning time difference is calculated by a comparison unit based on the correction coefficient and scanning times of the light beams, and the downstream laser-light detection sensor is rotated by a sensor rotation drive unit to make the scanning time difference zero, whereby the slits are made parallel to each other.

6 Claims, 9 Drawing Sheets

OPTICAL SCANNING APPARATUS AND CONTROL METHOD THEREFOR

BACKGROUND OF THE INVENTION

1. Field of the Invention

The present invention relates to an optical scanning apparatus having a light emission unit that emits plural light beams, and relates to a control method for the optical scanning apparatus.

2. Description of the Related Art

Conventionally, various techniques have been proposed to improve the accuracy of beam scanning position in an image forming apparatus of a type where a light beam (such as laser light modulated according to an image signal) is deflected and scanned by a rotary polygonal mirror across a photosensitive drum, whereby an image is formed.

In recent years, the rotation speed of the rotary polygonal mirror has been increased and in addition, multi-beam laser has become progressively used in order to increase the scanning speed to thereby improve the printing speed.

As for multi-beam image formation, a variety of methods have been proposed to improve the accuracy of scanning position, especially, for keeping a main scanning scale factor constant. As a typical example, there is a method for correcting the main scanning scale factor in realtime by using laser-light detection sensors disposed outwardly of opposite ends of the photosensitive drum or disposed at optically equivalent positions.

FIG. 12 shows the construction of a conventional exposure device mounted on a printer for detecting the laser-light scanning speed used for correction of the main scanning scale factor. The exposure device includes a laser light emission unit 101, collective lens (collimater lens) 102, rotary polygonal mirror (polygon mirror) 103, imaging lens 104, laser-light detection sensors 105, 106, and photosensitive drum 107.

The laser light emission unit 101 emits laser light 108 modulated according to image data. The laser light 108 is made into parallel beams by the collective lens 102, and deflected by the polygon mirror 103. The laser light 108 is then irradiated through the imaging lens 104 onto the photosensitive drum 107 whose surface is uniformly charged, whereby the drum 107 is scanned with the laser light in a main scanning direction. In synchronism with the scanning with the laser light 108, the photosensitive drum 107 is rotatably driven. As a result, the laser light 108 and the photosensitive drum 107 move relative to each other in a sub-scanning direction, whereby a two-dimensional electrostatic latent image is formed on the photosensitive drum 107. At that time, a timing of starting writing of each line of the electrostatic latent image in the main scanning direction is adjusted based on a detection output from the laser-light detection sensor 105.

Next, the electrostatic latent image formed on the photosensitive drum 107 is developed by adhering toner charged with opposite polarity to the electrostatic latent image, and the developed image is transferred to a recording sheet (not shown).

A method for correcting the main scanning scale factor is described in, e.g., Japanese Laid-open Patent Publication No. 2006-150696. In this method, laser-light detection sensors 105, 106 are used to measure a scanning time required for laser light 108 to pass through from the sensor 105 to the sensor 106, and the main scanning scale factor is corrected based on the measured scanning time.

FIG. 13 shows a positional relation between laser-light detection sensors and scanning loci of plural pieces of laser light. As shown in FIGS. 12 and 13, the laser-light detection sensors 105, 106 are disposed away from each other by a distance 115 which is greater than the entire width of an image forming region on the photosensitive drum 107. The plural pieces of laser light LB1 to LB4 are scanned along loci 111 which are shifted from one another in the sub-scanning direction.

In the measurement of a scanning time required for each of the pieces of laser light LB1 to LB4 to pass through between the two sensors 105, 106, time points where each laser light passes through a slit 113 formed in the sensor 105 and where it passes through a slit 114 formed in the sensor 106 are measured.

In a state that the laser-light detection sensor 106 is mounted inclined as shown by a dotted line 116 in FIG. 13, time points where respective pieces of laser light pass through the slit 114 vary according to sub-scanning direction positions in the slit passed by the respective pieces of laser light. For example, if a distance between adjacent pieces of laser light in the sub-scanning direction is 200 μm and the sensor 106 is inclined by an angle of 2 degrees, a distance between the slits is deviated by about 5 μm between adjacent pieces of laser light, resulting in an error in measurement values of scanning times required for the respective pieces of laser light to pass through between the sensors. As a result, it becomes impossible to perform proper correction of the main scanning scale factor. To obviate this, an adjustment to make the slits parallel to each other is generally performed. An adjustment mechanism therefor is disclosed in Japanese Laid-open Patent Publication No. 08-132670.

However, the adjustment mechanism has a problem that much effort is required for adjustment work since this mechanism is configured to be operated by an operator to adjust the slits to be parallel to each other based on a state of an image transferred onto a sheet material.

It is also possible to measure scanning times required for two different laser light beams each to pass through between sensors and adjust slits to be parallel to each other by adjusting slit positions such that the measured scanning times become equal to each other. With this adjustment method, it becomes possible to detect and correct deterioration of the parallel degree between the slits, which is caused by secular change or the like.

In the case of multi-beam image formation, respective beams have wavelength differences therebetween and have different refractive angles. As a result, differences occurs in the main scanning scale factor between the respective beams. Accordingly, in a case that there are wavelength differences between the beams, a problem is posed that the main scanning scale factor cannot be properly corrected, even if the slit positions are adjusted such that scanning times become equal to each other between the respective beams.

As for a light emission unit having laser elements integrated thereon, temperatures of these laser elements become different from one another depending on a use state of the light emission unit. In that case, differences occur in temperature-dependent beam wavelengths, posing a problem that the main scanning scale factor cannot be properly corrected.

Further, there is a method in which scanning times measured for beams are electrically corrected, without performing a slit adjustment to make sensor slits parallel to each other. With such a method, it is possible to correct scanning times of two beams used for the scanning time measurement, but it is not possible to correct scanning times of the other beams. In a case that beam scanning positions are shifted in the sub-scanning direction due to temperature rise inside the apparatus, the scanning times cannot be corrected without identifying the beam scanning positions after being shifted, so that a problem is posed that the main scanning scale factor cannot be properly corrected.

SUMMARY OF THE INVENTION

The present invention provides an optical scanning apparatus and a control method therefor, which are capable of properly correcting a main scanning scale factor.

According to one aspect of this invention, there is provided an optical scanning apparatus for forming an electrostatic latent image on a photosensitive member, comprising a light emission unit configured to emit plural light beams including first and second light beams and arranged to form images of light at different positions in a rotation direction of the photosensitive member, a deflection unit configured to deflect the light beams emitted from the light emission unit such that the light beams move in a predetermined direction, wherein the photosensitive member is positioned on movement paths of the light beams deflected by the deflection unit, a first detection unit disposed on the movement paths of the light beams and configured to detect each of the first and second light beams emitted from the light emission unit before the light beams move along an image region on the photosensitive member, a second detection unit disposed on the movement paths of the light beams and configured to detect each of the first and second light beams emitted from the light emission unit after the light beams have moved along the image region on the photosensitive member, a measurement unit configured to measure a first time period from when the first detection unit detects the first light beam to when the second detection unit detects the first light beam and measure a second time period from when the first detection unit detects the second light beam to when the second detection unit detects the second light beam, and a position adjustment unit configured to adjust relative positions of the first and second detection units such as to make the first time period equal to a product of the second time period and a correction coefficient set based on a wavelength difference between the first and second light beams.

With this invention, relative positions of the first and second detection units are adjusted such that the first scanning time becomes equal to the product of the second scanning time and the correction coefficient, whereby the main scanning scale factor can properly be corrected. In a case where there is a difference between wavelengths of light beams, a difference between scanning times of the light beams is calculated from the wavelength difference and based on the calculated scanning time difference, the relative positions of the first and second detection units are adjusted. Accordingly, the first and second detection units can be made accurately parallel to each other.

In addition, an amount of positional shift between the first and second detection units can be corrected as required during long time use, and it is therefore possible to perform high definition printing.

Further features of the present invention will become apparent from the following description of exemplary embodiments with reference to the attached drawings.

DESCRIPTION OF THE EMBODIMENTS

The present invention will now be described in detail below with reference to the drawings showing preferred embodiments thereof.

(First Embodiment)

Figure 1:
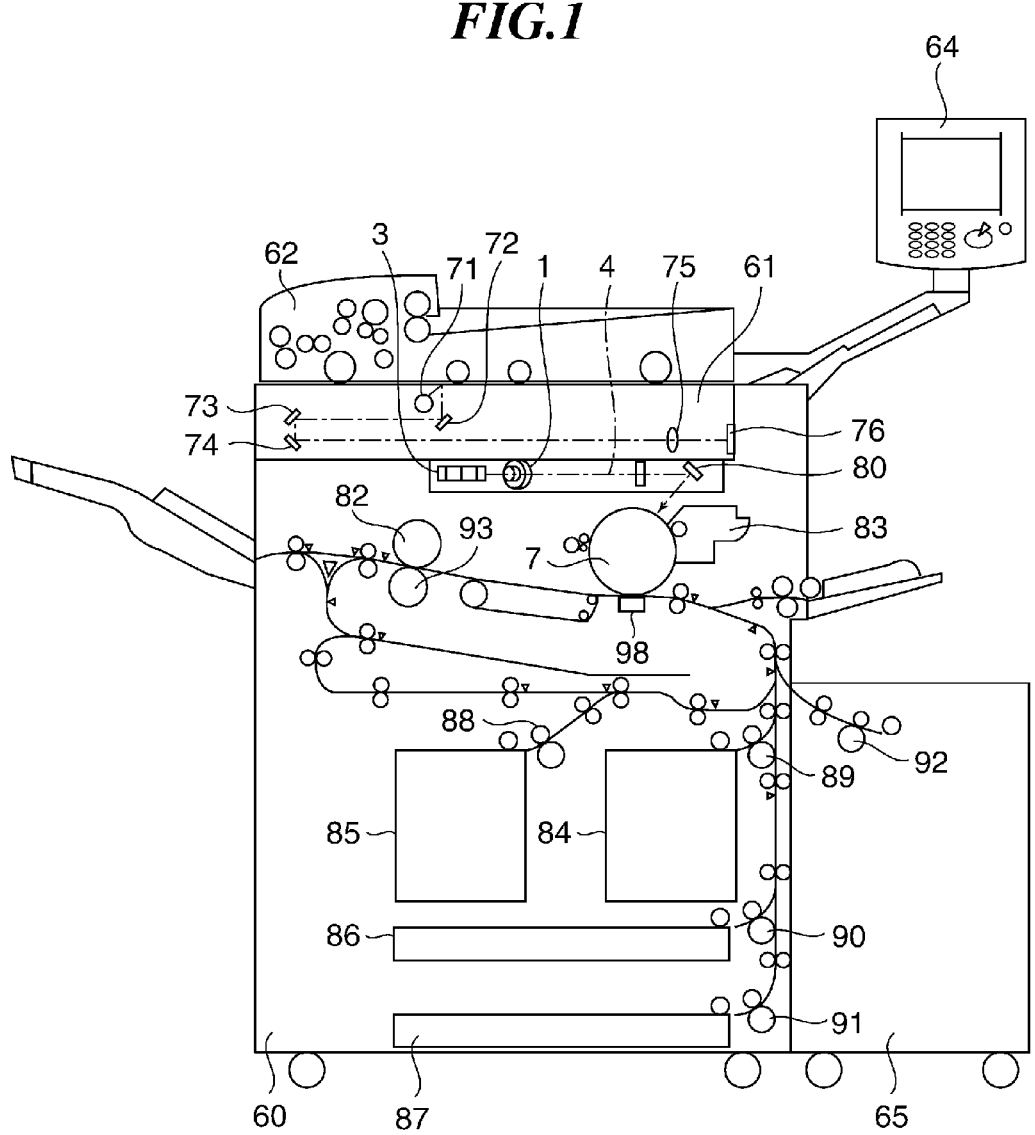
FIG. 1 is a view showing the construction of an image forming apparatus mounted with an exposure device which is an optical scanning apparatus according to a first embodiment of this invention.

FIG. 1 shows the construction of an image forming apparatus mounted with an exposure device which is an optical scanning apparatus according to a first embodiment of this invention.

The image forming apparatus mainly includes a printer unit 60 for outputting an original image on a recording sheet and a scanner unit 61 for reading an original image. Reference numeral 62 denotes an automatic original feeder mounted on the top of the scanner unit 61, and 64 denotes an operation unit used by a user to set various modes such as a copy mode and cause a display device of the operation unit 64 to display a current job status and various setting values of the image forming apparatus.

The printer unit 60 includes sheet feed stages 84 to 87 in which recording sheets of various sizes can be stored. A large-capacity sheet deck 65 can be connected to the printer unit 60. A recording sheet is conveyed from any of sheet feed stages 84 to 87 and the sheet deck 65 by a corresponding one of sheet feed/conveyance rollers 88 to 92, which are driven by motors (not shown), to a sheet conveyance path in the image forming apparatus.

The scanner unit 61 has an original table disposed on an upper surface of the scanner unit 61 and a light source 71 disposed to be movable in a left-to-right direction in FIG. 1. The light source 71 irradiates light onto an original conveyed from the automatic original feeder 62 to the original table or placed on the original table by a user. The irradiated light is reflected by the original, and an optical image of the original is formed on a CCD 76 through mirrors 72 to 74 and a lens 75. The CCD 76 converts the optical image into digital image data. According to a user's request, an image conversion process such as enlargement or reduction is performed on the image data, and the conversion-processed image data is stored into an image memory (not shown).

At the time of image output, the printer unit 60 reads digital image data stored in the image memory and reconverts it into an analog signal. According to the analog signal, the printer unit 60 causes the exposure device to irradiate and scan laser beams onto a to-be-scanned surface of a photosensitive drum 7 (more generally, a photosensitive member).

The photosensitive drum 7 is provided at its surface with a photoconductive layer made of an organic photoconducting material. On an image formation region (hereinafter, sometimes referred to as the image region) of the surface of the photosensitive drum 7, a visual image is formed by toner supplied from a developing device 83.

A recording sheet is conveyed from any of the sheet feed stages 84 to 87 and the sheet deck 65 along the sheet conveyance path, and passes through below the photosensitive drum 7 formed with the visual image. A transfer charging device 98 transfers the visual image formed on the drum 7 to the recording sheet. The recording sheet transferred with the unfixed visual image (toner image) is conveyed to a nip portion between a fixing roller 82 and a pressing roller 93, and the unfixed toner image is fixed to the recording sheet by the rollers 82, 93. The recording sheet fixed with the toner image is discharged from the printer unit 60 to the outside.

Figure 2:
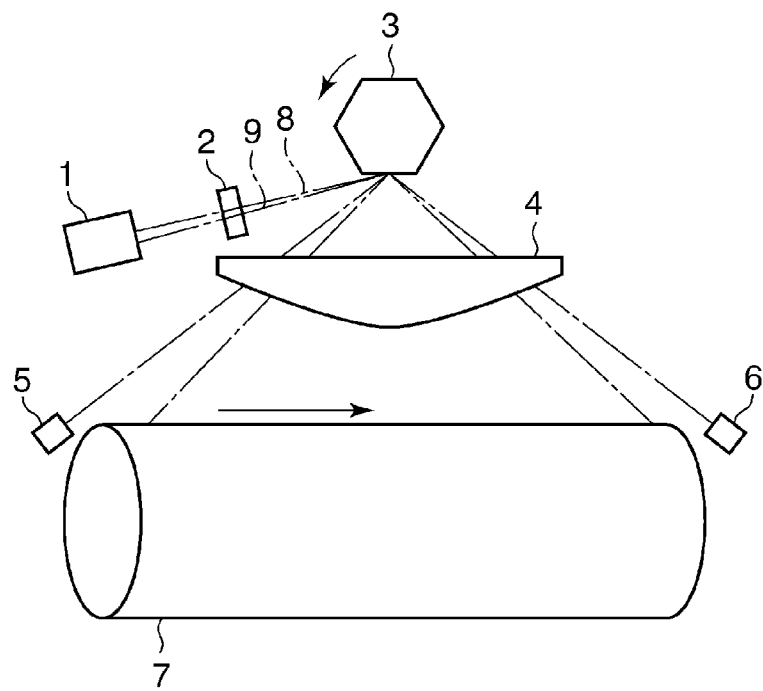
FIG. 2 is a view showing the construction of the exposure device.

FIG. 2 shows the construction of the exposure device. The exposure device includes a laser light emission unit 1, collective lens (collimater lens) 2, rotary polygonal mirror (polygon mirror) 3, imaging lens 4, and light beam detection sensors 5, 6.

The laser light emission unit 1 includes a plurality of (e.g., two) laser elements (not shown) that emit light beams, e.g., laser light modulated according to image data. In FIG. 2, reference numerals 8 and 9 denote first and second light beams emitted from respective ones of the two laser elements, i.e., first and second laser elements (first and second light emitting portions) of the laser light emission unit 1. The light beams 8 and 9 are made parallel to each other by the collective lens 2.

With rotation of the polygon mirror 3 in a direction shown by an arrow in FIG. 2, the light beams 8, 9 are deflected by the polygon mirror 3 and move in a main scanning direction (more generally, in a predetermined direction), whereby the photosensitive drum 7 is scanned with the light beams 8, 9 in the main scanning direction.

The first and second light beams 8, 9 are scanned parallel to each other on the photosensitive drum 7 and shifted from each other by a predetermined distance in a sub-scanning direction (i.e., a rotation direction of the photosensitive drum 7) perpendicular to the main scanning direction. In other words, the light beams 8, 9 are arranged to form images of light at different positions in the rotation direction of the photosensitive drum 7. In a case, for example, a 600 dpi image is formed, the predetermined distance is about 42 μm. It should be noted that optical paths of the light beams 8, 9 after being reflected by the polygon mirror 3 are shown in FIG. 2 by the same line.

The photosensitive drum 7 is positioned on movement paths of the light beams 8, 9 deflected by the polygon mirror 4, and is rotatably driven in synchronism with the scanning of the first and second light beams 8, 9. The light beams 8, 9 and the photosensitive drum 7 move relative to each other in the sub-scanning direction, whereby a two-dimensional electrostatic latent image is formed on the photosensitive drum 7.

As viewed in the main scanning direction, scanning ranges of the first and second light beams 8, 9 are each wider than the image forming region of the surface of the photosensitive drum 7. An upstream laser-light detection sensor (i.e., a first light-beam detection sensor) 5 is disposed upstream of an upstream end of the image forming region, whereas a downstream laser-light detection sensor (i.e., a second light-beam detection sensor) 6 is disposed downstream of a downstream end of the image forming region. The upstream and downstream laser-light detection sensors 5, 6 (first and second beam detection units) respectively detect the first and second light beams 8, 9 at locations outward of the image formation region on the photosensitive drum 7 as viewed in the main scanning direction. Specifically, the upstream laser-light detection sensor 5 is disposed on the movement paths of the light beams 8, 9, and detects each of the light beams 8, 8 emitted from the first and second laser elements before these light beams move along the image region on the photosensitive drum 7. On the movement paths of the light beams 8, 9, the downstream laser-light detection sensor 6 is disposed a predetermined distance L away from the upstream laser-light detection sensor 5 in the main scanning direction, and detects each of the light beams 8, 9 after these light beams have moved along the image region on the photosensitive drum 7.

The beam detection sensors 5, 6 are used to measure a scanning time required for each of the first and second light beams 8, 9 to pass through between these sensors, i.e., to measure a light beam scanning speed. The upstream laser-light detection sensor 5 is also used to generate a reference position signal that represents an image writing start position.

It should be noted that in FIG. 1 the laser-light detection sensors 5, 6 are disposed on an extension line from the image forming surface of the photosensitive drum 7. Alternatively, these sensors 5, 6 can be disposed at positions optically equivalent to the positions shown in FIG. 1, with reflection mirrors (not shown) or the like disposed in the optical paths of the light beams 8, 9.

Figure 3:
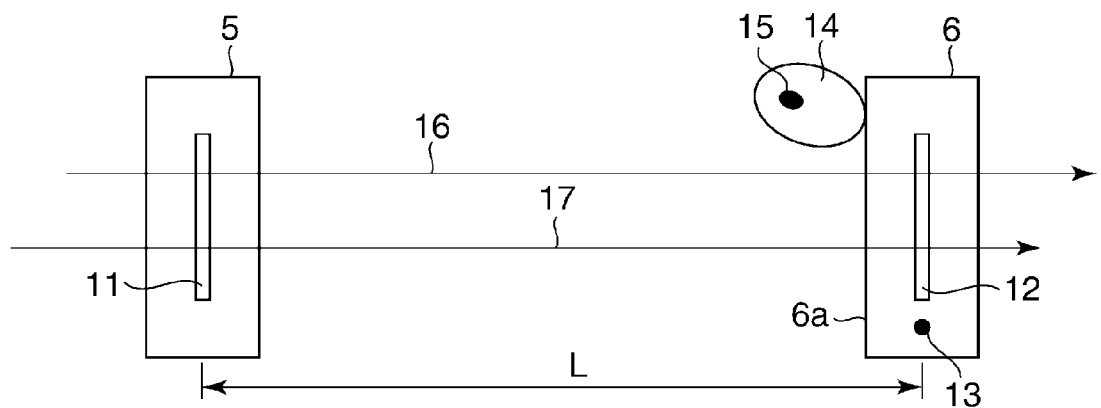
FIG. 3 is a view showing a positional relation between laser-light detection sensors and scanning loci of laser light beams in the exposure device.

FIG. 3 shows a positional relation between the laser-light detection sensors 5, 6 and scanning loci of the first and second light beams 8, 9. As previously described, the upstream and downstream laser-light detection sensors 5, 6 are disposed apart from each other by the distance L. These sensors 5, 6 are respectively formed with first and second slits 11, 12.

Each of the first and second light beams 8, 9 emitted from the first and second laser elements of the laser light emission unit 1 passes through the first and second slits 11, 12 formed in the upstream and downstream laser-light detection sensors 5, 6. Reference numerals 16, 17 denote the scanning loci of the first and second light beams 8, 9. The upstream laser-light detection sensor 5 detects each light beam 8 or 9 passing through the first slit 11 and outputs a signal upon detection thereof, and the downstream laser-light detection sensor 6 detects each light beam 8 or 9 passing through the second slit 12 and outputs a signal upon detection thereof.

The downstream laser-light detection sensor 6 is disposed to be rotatable about a fixed rotation shaft 13, and is urged by a spring (not shown) in a direction shown by an arrow. A cam 14 is disposed in contact with a side surface 6a of the downstream laser-light detection sensor 6 for rotation about a fixed rotation shaft 15. With rotation of the cam 14, an angle of the second slit 12 changes relative to the main scanning direction.

The first and second light beams 8, 9 pass through longitudinal positions, which are slightly apart from each other, in each of the slits 11, 12. Accordingly, passages of the light beams 8, 9 are measured at different longitudinal positions in each slit.

In a case where scanning speeds of the first and second light beams 8, 9 are the same as each other, it is possible to adjust the first and second slits 11, 12 to be parallel to each other by rotating the downstream laser-light detection sensor 6 such that the scanning times of the light beams 8, 9 become equal to each other.

It should be noted that although the downstream laser-light detection sensor 6 is disposed to be rotatable in this embodiment, the upstream laser-light detection sensor 5 can be disposed to be rotatable. Alternatively, both the sensors 5, 6 can be disposed to be rotatable. In short, it is enough to configure the sensors 5, 6 such that relative positions thereof can be adjusted. In the illustrated example, the first and second slits 11, 12 are formed at right angles relative to the scanning loci 16, 17 of the first and second light beams 8, 9, but can be formed at an angle other than right angles.

Figure 4:
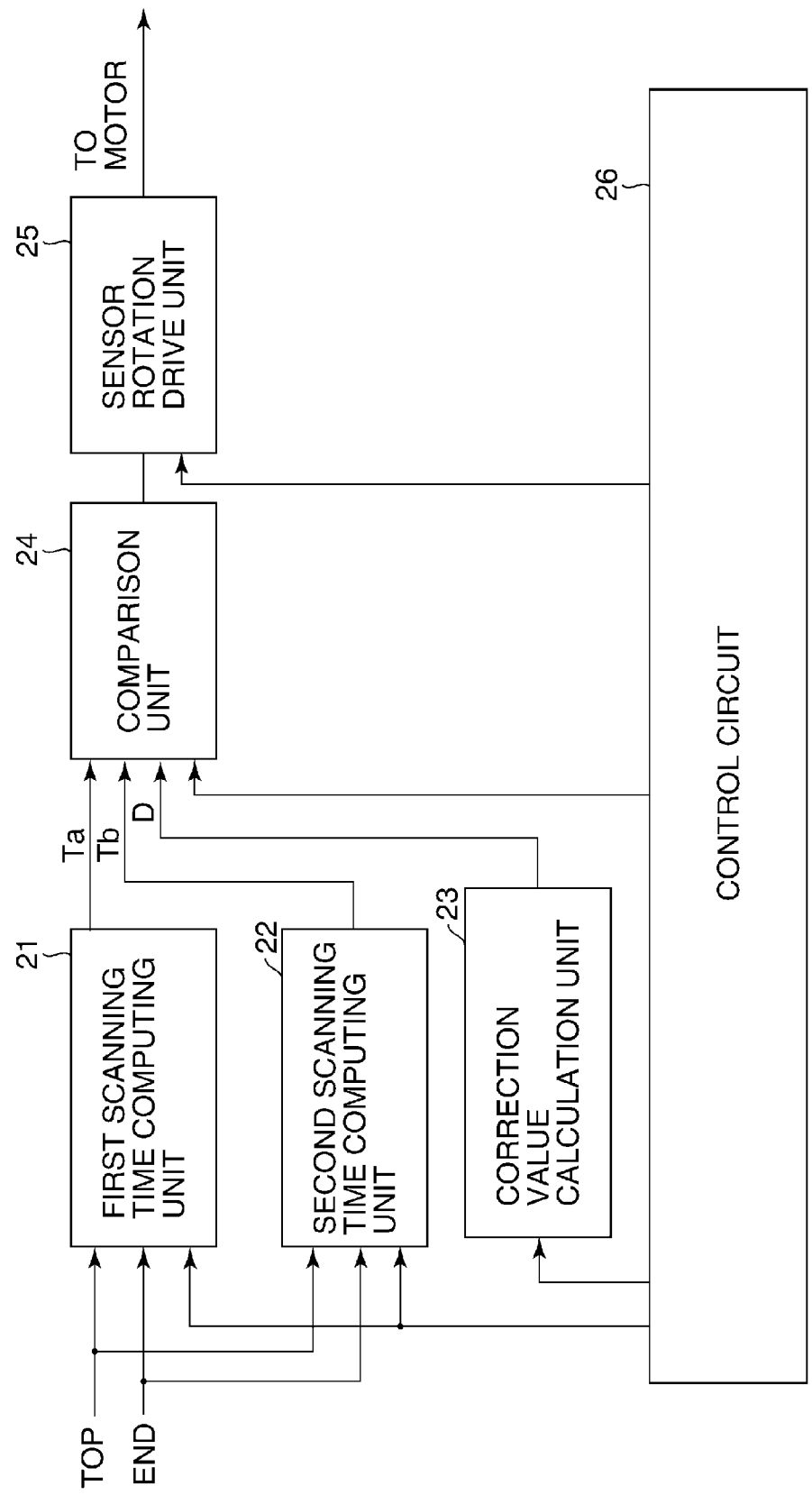
FIG. 4 is a block diagram showing the construction of a sensor position adjustment unit of the exposure device.

FIG. 4 shows in block diagram the construction of a sensor position adjustment unit for adjusting the rotation position of one of the sensors (more generally, for adjusting relative positions of the sensors). The sensor position adjustment unit includes a first scanning time computing unit 21, second scanning time computing unit 22, correction value calculation unit 23, comparison unit 24, sensor rotation drive unit 25, and control circuit 26.

The first scanning time computing unit 21 (measurement unit) computes a scanning time Ta of the first light beam 8 (first scanning time, or more generally, first time period) based on an output signal of the upstream laser-light detection sensor 5 generated upon passage of the light beam 8 through the sensor 5 and an output signal of the downstream laser-light detection sensor 6 generated upon passage of the light beam 8 through the sensor 6. The second scanning time computing unit 22 (measurement unit) computes a scanning time Tb of the second light beam 9 (second scanning time, or more generally, second time period) based on output signals of the laser-light detection sensors 5, 6 respectively generated upon passage of the beam 9 through the sensors 5, 6.

The correction value calculation unit 23 (correction coefficient acquisition unit) determines a wavelength difference Δλ from wavelengths λa, λb of the first and second light beams 8, 9 measured in advance, and decides a correction coefficient D. Based on the scanning times Ta, Tb and the correction coefficient D, the comparison unit 24 calculates a scanning time difference ΔT according to formula (1).

$$\Delta T = Ta - Tb \times D \tag{1}$$

The sensor rotation drive unit 25 rotates the downstream laser-light detection sensor 6 anticlockwise if the scanning time difference ΔT is positive, and rotates the sensor 6 clockwise if the scanning time difference ΔT is negative. By rotating the downstream laser-light detection sensor 6 anticlockwise or clockwise according to an angle that corresponds to the scanning time difference ΔT, i.e., by rotating the sensor 6 such that the scanning time difference ΔT becomes a value of 0, the first and second slits 11, 12 can be made accurately parallel to each other.

The control circuit 26 adjusts timings of signals output from respective parts of the sensor position adjustment unit. The above-described operations of the sensor position adjustment unit can be performed at the time of power on of the image forming apparatus or can be performed at intervals of a predetermined period during image formation.

Figure 5:
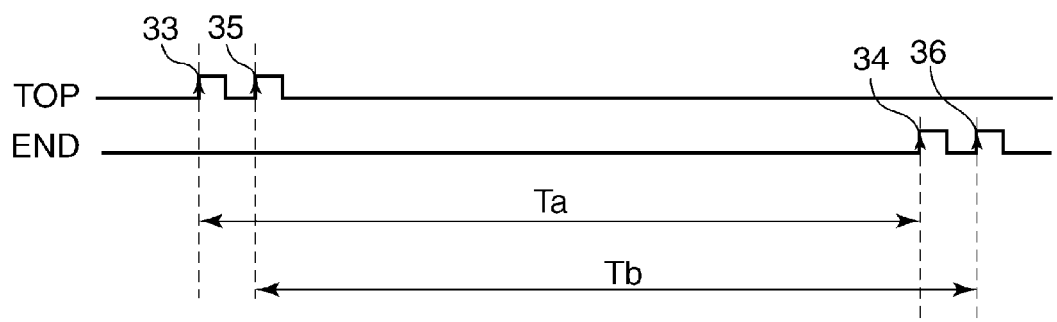
FIG. 5 is a timing chart showing a relation between sensor output signals and scanning times.

FIG. 5 is a timing chart showing a relation between sensor output signals and scanning times. In FIG. 5, output signals TOP of the upstream laser-light detection sensor 5 and output signals END of the downstream laser-light detection sensor 6 are shown.

The first scanning time computing unit 21 uses a high-speed counter to measure a scanning time Ta from a leading edge 33 of the output signal TOP of the upstream laser-light detection sensor 5 generated upon passage of the first light beam 8 through the sensor 5 to a leading edge 34 of the output signal END of the downstream laser-light detection sensor 6 generated upon passage of the first light beam 8 through the sensor 6. The second scanning time computing unit 22 uses a high-speed counter to measure a scanning time Tb from a leading edge 35 of the output signal TOP of the upstream laser-light detection sensor 5 generated upon passage of the second light beam 9 through the sensor 5 to a leading edge 36 of the output signal END of the downstream laser-light detection sensor 6 generated upon passage of the second light beam 9 through the sensor 6.

Although the scanning times Ta, Tb are measured in the same scanning in the method described in this embodiment, these scanning times can be measured in different scannings, while independently lighting the first and second light beams 8, 9.

Figure 6:
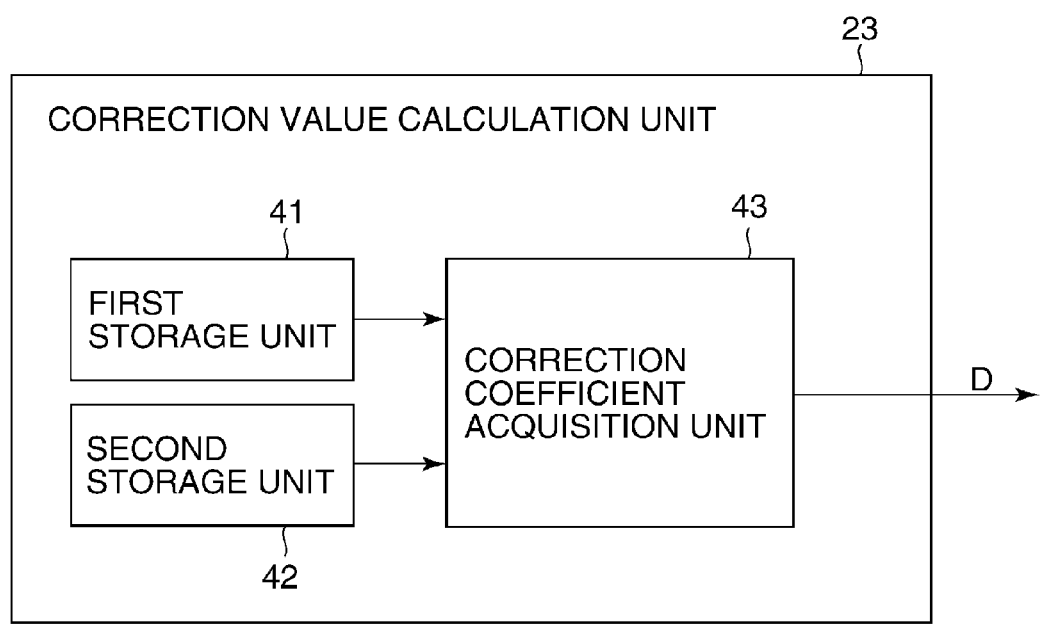
FIG. 6 is a block diagram showing the construction of a correction value calculation unit of the exposure device.

FIG. 6 shows in block diagram the construction of the correction value calculation unit 23. The correction value calculation unit 23 includes a first storage unit 41 that stores a value of the wavelength λa (first wavelength) of the first light beam 8 measured in advance, a second storage unit 42 that stores a value of the wavelength λb (second wavelength) of the second light beam 9 measured in advance, and a correction coefficient acquisition unit 43 that acquires a correction coefficient D.

The correction coefficient acquisition unit 43 determines a wavelength difference Δλ from the values of the wavelength λa, λb read from the first storage unit 41 and the second storage unit 42, and determines a correction coefficient D corresponding to the wavelength difference Δλ according to the following formula (2).

$$D = (T + \Delta\lambda \times K)/T \tag{2}$$

In formula (2), K denotes a coefficient, and T denotes a scanning time of a light beam used to determine the coefficient K, e.g., a scanning time Ta of the first light beam 8.

Assuming that the wavelength difference Δλ is 1 nm, a difference between scanning times of the light beams 8, 9 becomes about 5 ns although the scanning time difference varies depending on the accuracy of optical system and the rotation speed of and the number of faces of the polygon mirror. In that case, the coefficient K can be determined as having a value of 5 ns by means of simple calculation. The correction coefficient D obtained as a result of the calculation according to formula (2) represents a ratio of expansion and contraction of the main scanning scale factor corresponding to the wavelength difference Δλ.

To determine the correction coefficient D corresponding to a value of the wavelength difference Δλ, the correction coefficient acquisition unit 43 can refer to a correction table (not shown) in which various correction coefficients D corresponding to various wavelength differences Δλ are registered beforehand, instead of using formula (2).

Figure 7A:
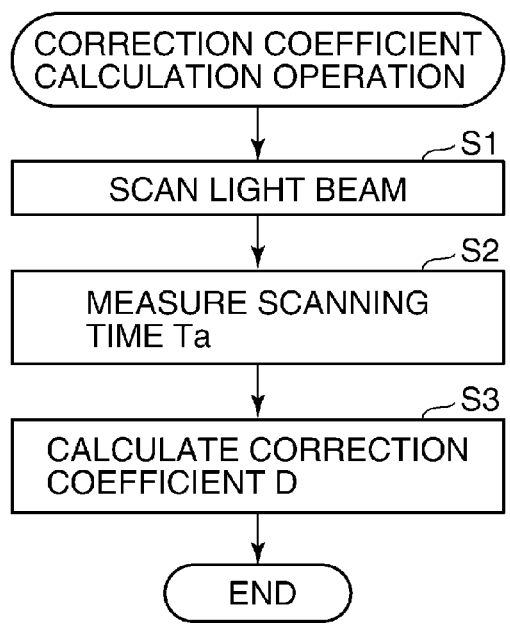
FIG. 7A is a flowchart showing a correction coefficient calculating operation of the exposure device.
Figure 7B:
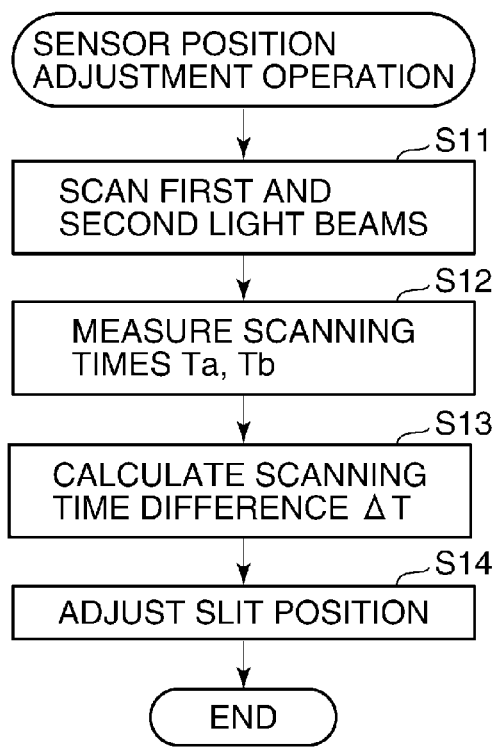
FIG. 7B is a flowchart showing a sensor position adjustment operation of the exposure device.

FIGS. 7A and 7B show in flowcharts a correction coefficient calculation operation and a sensor position adjustment operation of the exposure device. In the correction coefficient calculation operation shown in FIG. 7A, the laser light emission unit 1 is driven and the photosensitive drum 7 is scanned by the first light beam 8 (step S1). Next, a scanning time Ta is measured by the first scanning time computing unit 21 (step S2). Then, a correction coefficient D is calculated according to formula (2) by the correction value calculation unit 23 based on the measured scanning time Ta and the wavelength difference Δλ (step S3), whereupon the correction coefficient calculation operation is completed.

In the sensor position adjustment operation shown in FIG. 7B, the laser light emission unit 1 is driven, and the photosensitive drum 7 is scanned by the first and second light beams 8, 9 (step S11). Next, scanning times Ta, Tb of the first and second light beams 8, 9 are measured by the first and second scanning time computing units 21, 22 (step S12).

Based on the correction coefficient D calculated in step S3 and the scanning times Ta, Tb measured in step S12, a scanning time difference ΔT is calculated according to formula (1) by the comparison unit 24 (step S13). Next the cam 14 is driven by the sensor rotation drive unit 25 by an amount of rotation registered in advance corresponding to the scanning time difference ΔT, thereby rotating the downstream laser-light detection sensor 6 to adjust the slit position of the sensor 6 (step S14). Then, the sensor position adjustment operation is completed.

It is assumed in this embodiment that amounts of rotation corresponding to scanning time differences ΔT have been registered in advance. However, it is not inevitably necessary to register the amounts of rotation. In that case, after the slit position has once been adjusted in step S14, the process returns to step S1 to scan the photosensitive drum 7 with the light beams 8, 9, and such a slit position adjustment is repeated until the scanning time difference ΔT calculated in step S13 becomes equal to a value of 0.

According to the optical scanning apparatus of the first embodiment, it is possible to adjust the slits to be accurately parallel to each other by the slit position adjustment that takes account of the wavelength difference Δλ between the light beams 8, 9. Since the position of the downstream laser-light detection sensor 6 is adjusted such that the scanning time Ta becomes equal to the product of the scanning time Tb and the correction coefficient D, the main scanning scale factor can properly be corrected. In a case that the light beams 8, 9 have different wavelengths, the slit position is adjusted based on the scanning time difference ΔT which is in turn calculated based on the wavelength difference Δλ between the light beams 8, 9, and it is therefore possible to adjust the slits 11, 12 to be accurately parallel to each other.

In addition, an amount of positional shift between the upstream and downstream laser-light detection sensors can be corrected during long time use, and it is therefore possible to perform high definition printing.

The correction coefficient D can easily be determined by measuring the scanning time T required for one of light beams to pass through between the slits. Further, the slit position adjustment can easily be made by changing the inclination of the downstream laser-light detection sensor. In addition, an accurate slit position adjustment can be achieved by detecting passage of light beams through the slits.

In the above-described embodiment, a case has been described in which the correction coefficient D is calculated by the correction value calculation unit 23 of the image forming apparatus. However, the correction coefficient D can be acquired by reading a correction coefficient stored (registered) into the correction value calculation unit 23 (storage unit) by means of an apparatus other than the image forming apparatus at the time of factory shipment, for example.

(Second Embodiment)

An exposure device according to a second embodiment of this invention is configured to measure temperatures of laser elements of a laser light emission unit and performs a sensor position adjustment by taking account of temperature differences between the laser elements.

Figure 8:
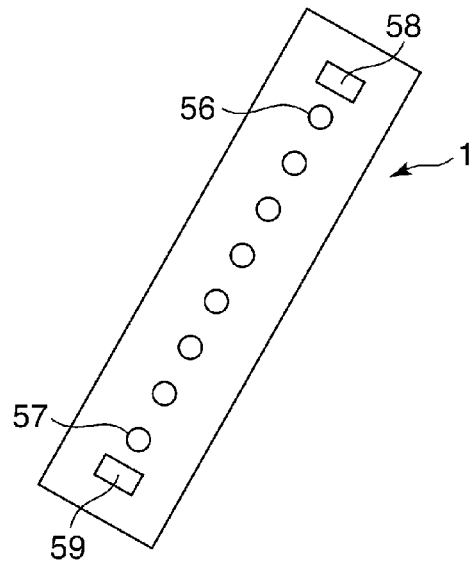
FIG. 8 is a view showing the construction of a laser light emission unit of an exposure device according to a second embodiment of this invention.

FIG. 8 shows the construction of a laser light emission unit 1 in the second embodiment. The laser light emission unit 1 has an array structure having eight laser elements disposed in series with one another. These eight laser elements include a first laser element 56 disposed at one end portion of the laser light emission unit 1 and a second laser element 57 disposed at another end portion of the emitter 1. A first temperature sensor 58 is disposed in the vicinity outside the first laser element 56, and a second temperature sensor 59 is disposed in the vicinity outside the second laser element 57.

The first temperature sensor 58 (first temperature detection unit) measures a temperature of the first laser element 56 (first light emitting portion), and the temperature sensor 59 (second temperature detection unit) measures a temperature of the second laser element 57 (second light emitting portion).

Figure 9:
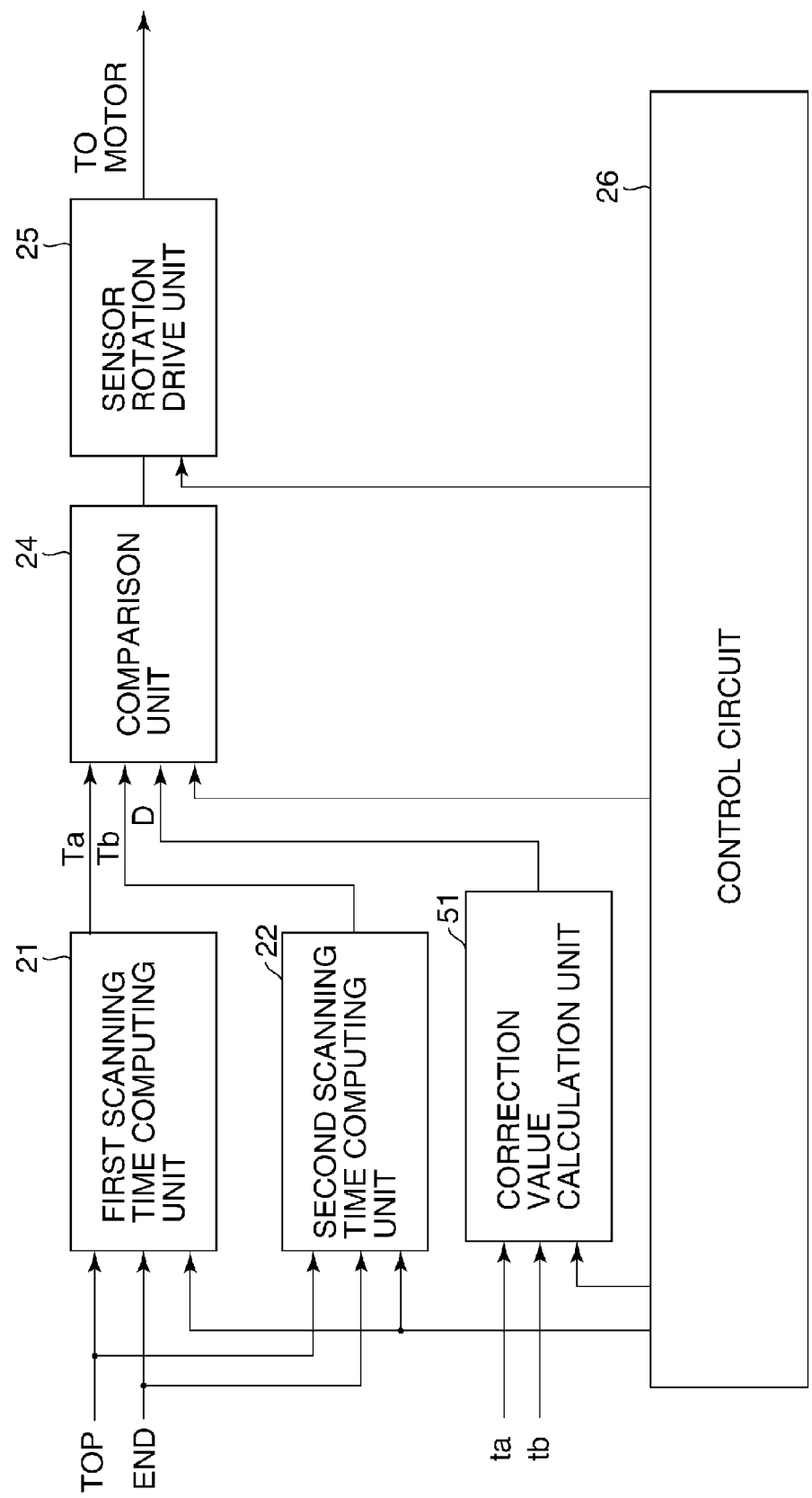
FIG. 9 is a block diagram showing the construction of a sensor position adjustment unit of the exposure device.

FIG. 9 shows in block diagram the construction of a sensor position adjustment unit. The sensor position adjustment unit includes first and second scanning time computing units 21, 22, comparison unit 24, sensor rotation drive unit 25, control circuit 26, and correction value calculation unit 51. Since the constituent elements 21, 22, and 24 to 26 are the same in construction as those of the first embodiment, a description thereof will be omitted.

The correction value calculation unit 51 determines a temperature difference Δt between a temperature to of the first laser element 56 measured by the temperature sensor 58 and a temperature tb of the second laser element 57 measured by the temperature sensor 59, determines a wavelength difference Δλ between the wavelengths λa, λb of the first and second light beams 8, 9 measured in advance, and decides a correction coefficient D based on the temperature difference Δt and the wavelength difference Δλ.

Figure 10:
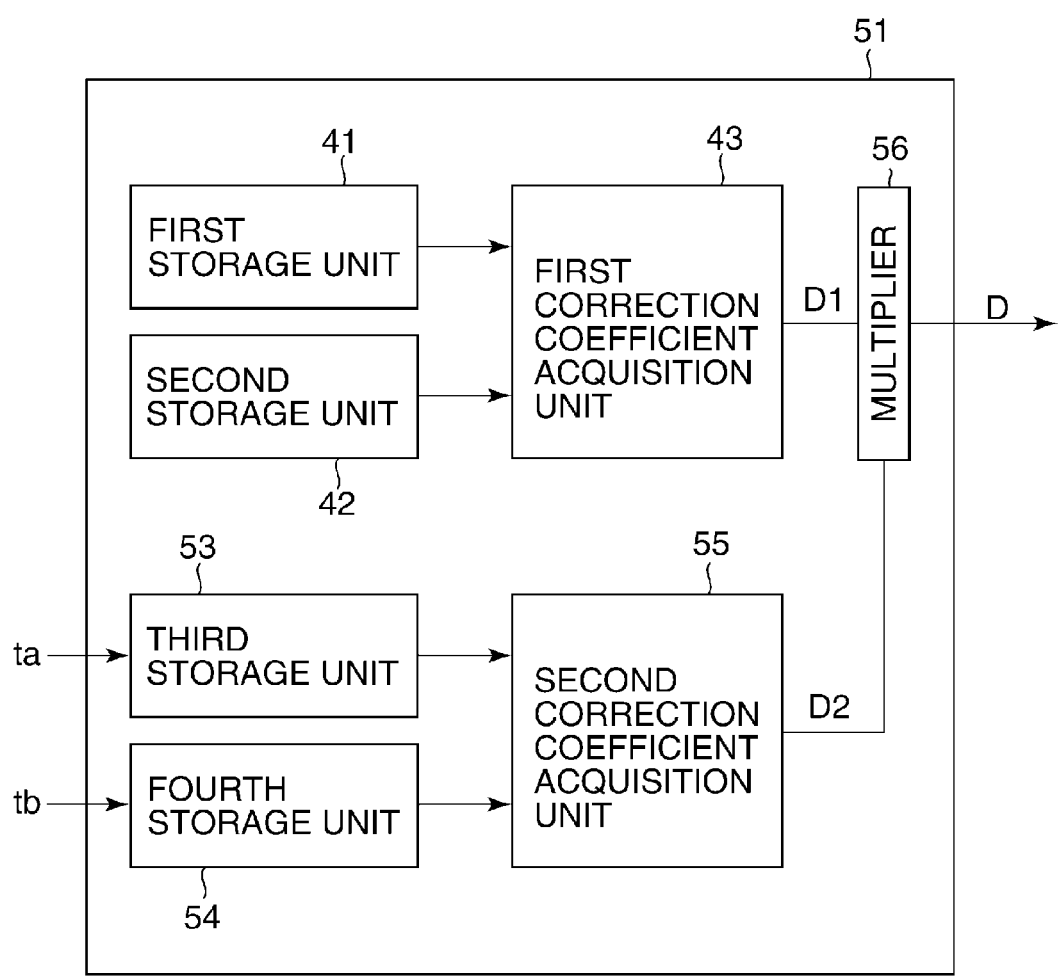
FIG. 10 is a block diagram showing the construction of a correction value calculation unit of the exposure device.

FIG. 10 shows in block diagram the construction of the correction value calculation unit 51. The correction value calculation unit 51 includes a first storage unit 41 that stores a value of the wavelength λa of the first light beam 8 measured in advance, a second storage unit 42 that stores a value of the wavelength λb of the second light beam 9 measured in advance, and a first correction coefficient acquisition unit 43 that acquires a first correction coefficient D1. The correction value calculation unit 51 further includes a third storage unit 53 that stores a value of the temperature to (first temperature) of the first laser element, a fourth storage unit 54 that stores a value of the temperature tb (second temperature) of the second laser element, a second correction coefficient acquisition unit 55 that acquires a second correction coefficient D2, and a multiplier 56 that determines the product of the first and second correction coefficients D1, D2 as a correction coefficient D.

The first correction coefficient acquisition unit 43 determines a wavelength difference Δλ between the wavelengths λa and λb read from the first storage unit 41 and the second storage unit 42, and determines a first correction coefficient D1 corresponding to the wavelength difference Δλ according to the following formula (3).

$$D1=(T+\Delta\lambda \times K1)/T \tag{3}$$

In formula (3), K1 denotes a coefficient, and T denotes a scanning time of a light beam used to determine the coefficient K1, e.g., a scanning time Ta of the first light beam 8.

Assuming that the wavelength difference Δλ is 1 nm, a difference between scanning times of the light beams 8, 9 becomes about 5 ns although the scanning time difference varies depending on the accuracy of optical system and the rotation speed of and the number of faces of the polygon mirror. In that case, the coefficient K1 can be determined as having a value of 5 ns by means of simple calculation. The correction coefficient D1 obtained as a result of the calculation according to formula (3) represents a ratio of expansion and contraction of the main scanning scale factor corresponding to the wavelength difference Δλ.

The correction value calculation unit 51 determines a temperature difference Δt from temperatures ta, tb of the first and second laser elements measured at the time of execution of correction, and determines a second correction coefficient D2 corresponding to the temperature difference Δt according to the following formula (4).

$$D2=(T+\Delta t \times K2)/T \qquad (4)$$

In formula (4), K2 denotes a coefficient, and T denotes a scanning time of a light beam used to determine the coefficient K2.

To determine the correction coefficients D1, D2 respectively corresponding to a value of the wavelength difference Δλ and a value of the temperature difference Δt, instead of using formulae (3) and (4), the first and second correction coefficient acquisition units 43, 55 can respectively refer to a first correction table (not shown) registered beforehand with correction coefficients D1 corresponding to wavelength differences Δλ and a second correction table (not shown) registered beforehand with correction coefficients D2 corresponding to temperature differences Δt.

There is a strong correlation between temperature and laser light wavelength. For example, the rate of change in wavelength per degree of temperature change is 0.3 nm/degree C. In that case, the coefficient K2 can be determined as having a value of 5/0.3 ns by means of simple calculation.

The correction coefficient D obtained as the product of the correction coefficients D1, D2 represents a ratio of expansion and contraction of the main scanning scale factor corresponding to the wavelength difference Δλ.

Figure 11:
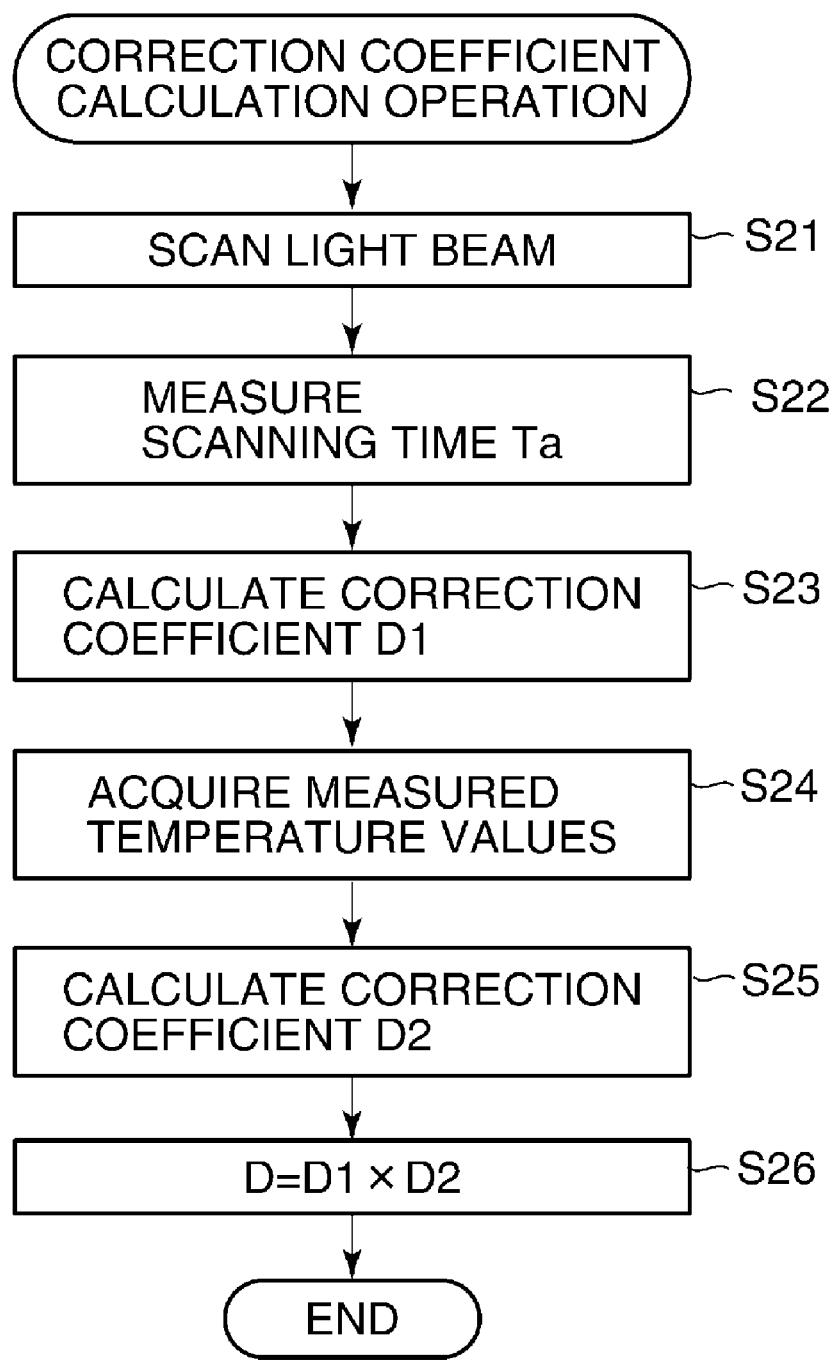
FIG. 11 is a flowchart showing a correction coefficient calculating operation of the exposure device.
Figure 12:
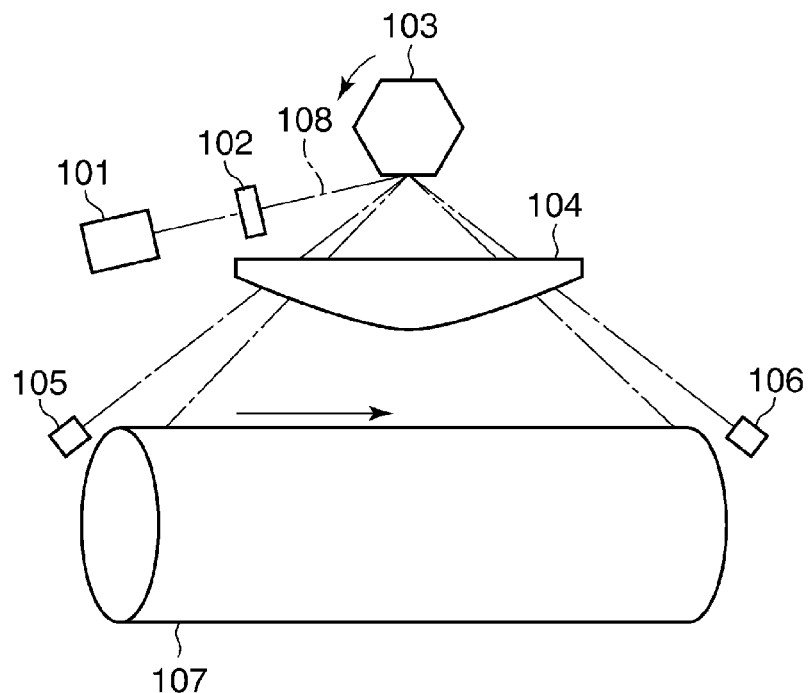
FIG. 12 is a view showing the construction of a conventional exposure device.
Figure 13:
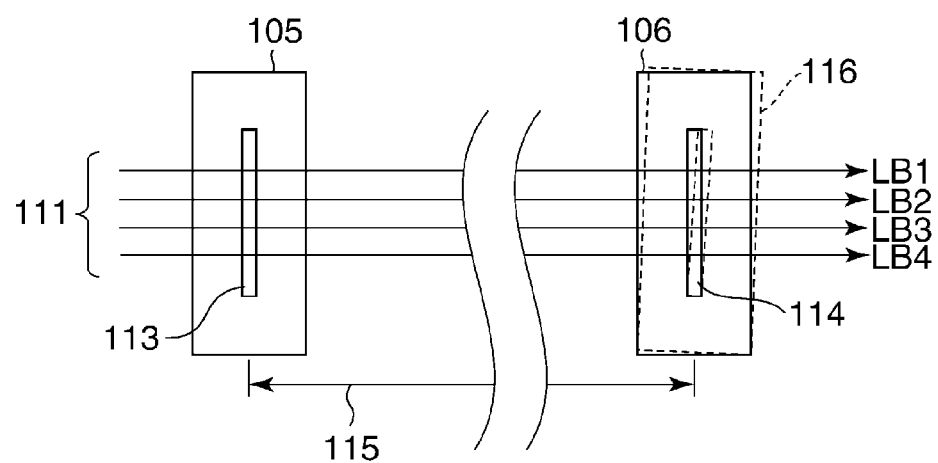
FIG. 13 is a view showing a positional relation between laser-light detection sensors shown in FIG. 12 and scanning loci of plural pieces of laser light.

FIG. 11 shows in flowchart a correction coefficient calculation operation of the exposure device. The exposure device drives the laser light emission unit 1 and scans the photosensitive drum 7 with the light beam 8 (step S21). Next, a scanning time Ta of the light beam 8 is measured by the first scanning time computing unit 21 (step S22). Then, a first correction coefficient D1 is calculated according to formula (3) by the correction value calculation unit 51 based on the measured scanning time Ta and the wavelength difference Δλ (step S23).

Values of temperatures ta, tb respectively measured by the temperature sensors 58, 59 are acquired by the correction value calculation unit 51 (step S24). A temperature difference Δt is then calculated by the calculation unit 51 from the measured temperatures ta, tb, and a second correction coefficient D2 is calculated by the unit 51 according to formula (4) based on the temperature difference Δt and the measured scanning time Ta (step S25).

The exposure device determines a correction coefficient D by multiplying the calculated correction coefficients D1, D2 together (step S26). Then, the correction coefficient calculation operation is completed.

Since the sensor position adjustment operation of the exposure device is the same as that in the first embodiment, a description thereof is omitted.

According to the optical scanning apparatus of the second embodiment, it is possible to adjust the slits to be accurately parallel to each other by the slit position adjustment that takes account of a wavelength difference between pieces of laser light emitted from laser elements incorporated in the laser light emission unit and a wavelength difference between pieces of laser light caused by a temperature difference between the laser elements.

Since the correction coefficient D2 is acquired based on a temperature difference between laser elements, the slits can be made accurately parallel to each other even if an array type laser light emission unit is used on which laser elements are integrated.

It should be noted that it is not inevitably necessary to acquire the correction coefficients D1, D2 by the image forming apparatus. For example, the correction coefficients D1, D2 can be acquired by an apparatus other than the image forming apparatus at the time of factory shipment and can be stored (registered) into the correction value calculation unit 51 (storage unit).

This invention is not limited to the construction of the above-described embodiments.

For example, image forming apparatuses to which the optical scanning apparatus of this invention is applied include a printing apparatus, a facsimile machine having a printing function, and a multi-function peripheral (MFP) having a printing function, copy function, scanner function, etc.

Although a monochrome image forming apparatus has been described in the embodiments, this invention is also applicable to a color image forming apparatus.

It is also possible to modify shapes and relative locations of component parts described in the embodiments according to the construction of an apparatus to which this invention is applied and according to conditions under which the apparatus operates.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-163250, filed Jul. 20, 2010, which is hereby incorporated by reference herein in its entirety.

What is claimed is:

1. An optical scanning apparatus for forming an electrostatic latent image on a photosensitive member, comprising:
    a light emission unit configured to emit plural light beams including first and second light beams and arranged to form images of light at different positions in a rotation direction of the photosensitive member;
    a deflection unit configured to deflect the light beams emitted from said light emission unit such that the light beams move in a predetermined direction, wherein the photosensitive member is positioned on movement paths of the light beams deflected by said deflection unit;
    a first detection unit disposed on the movement paths of the light beams and configured to detect each of the first and second light beams emitted from said light emission unit before the light beams move along an image region on the photosensitive member;
    a second detection unit disposed on the movement paths of the light beams and configured to detect each of the first and second light beams emitted from said light emission unit after the light beams have moved along the image region on the photosensitive member;
    a measurement unit configured to measure a first time period from when said first detection unit detects the first light beam to when said second detection unit detects the first light beam and measure a second time period from when said first detection unit detects the second light beam to when said second detection unit detects the second light beam; and
    a position adjustment unit configured to adjust relative positions of said first and second detection units such as to make the first time period equal to a product of the second time period and a correction coefficient set based on a wavelength difference between the first and second light beams.

2. The optical scanning apparatus according to claim 1, including:
   a correction coefficient acquisition unit configured to acquire the correction coefficient based on the wavelength difference between the first and second light beams and based on the first and second time periods.

3. The optical scanning apparatus according to claim 2, wherein said light emission unit includes plural light emitting portions at least including a first light emitting portion configured to emit the first light beam and a second light emitting portion configured to emit the second light beam, a first temperature detection unit configured to detect a temperature of said first light emitting portion, and a second temperature detection unit configured to detect a temperature of said second light emitting portion, and
   said correction coefficient acquisition unit acquires the correction coefficient based on a temperature difference between said first and second light emitting portions as well as based on the wavelength difference between the first and second light beams and the first and second time periods.

4. The optical scanning apparatus according to claim 1, wherein at least one of said first and second detection units is configured to have a variable inclination relative to the predetermined direction, and
   said position adjustment unit changes the inclination of the at least one of said first and second detection units.

5. The optical scanning apparatus according to claim 1, wherein said first detection unit has a first slit and at least detects each of the first and second light beams passing through said first slit,
   said second detection unit has a second slit and at least detects each of the first and second light beams passing through said second slit, and
   said position adjustment unit adjusts the position of the at least one of said first and second detection units so as to make the first and second slits parallel to each other.

6. A control method for an optical scanning apparatus having a light emission unit for emitting plural light beams at least including first and second light beams shifted from each other in a rotation direction of a photosensitive member, a scanning unit for deflecting the light beams emitted from the light emission unit in a predetermined direction perpendicular to the rotation direction of the photosensitive member and for causing the light beams to scan a to-be-scanned surface of the photosensitive member, and first and second detection units each for detecting each of the first and second light beams at a region that deviates from the to-be-scanned surface in the predetermined direction, the second detection unit being disposed away from the first detection unit by a predetermined distance in the predetermined direction, comprising:
   a measurement step of measuring a first scanning time required for the first light beam to scan between the first and second detection units and measuring a second scanning time required for the second light beam to scan between the first and detection units; and
   a position adjustment step of adjusting a position of at least one of the first and second detection units such as to make the first scanning time equal to a product of the second scanning time and a correction coefficient set based on a wavelength difference between the first and second light beams.

* * * * *